US012542380B2

(12) United States Patent
Firth

(10) Patent No.: US 12,542,380 B2
(45) Date of Patent: Feb. 3, 2026

(54) SPIRAL LOCK ELECTRICAL CONNECTION ASSEMBLY

(71) Applicant: INNOVEX DOWNHOLE SOLUTIONS, INC., Houston, TX (US)

(72) Inventor: Gary Firth, Houston, TX (US)

(73) Assignee: INNOVEX DOWNHOLE SOLUTIONS, INC., Houston, TX (US)

( * ) Notice: Subject to any disclaimer, the term of this patent is extended or adjusted under 35 U.S.C. 154(b) by 356 days.

(21) Appl. No.: 18/253,688

(22) PCT Filed: Nov. 19, 2021

(86) PCT No.: PCT/US2021/060019

§ 371 (c)(1),
(2) Date: May 19, 2023

(87) PCT Pub. No.: WO2022/109223

PCT Pub. Date: May 27, 2022

(65) Prior Publication Data

US 2024/0014579 A1 Jan. 11, 2024

Related U.S. Application Data

(60) Provisional application No. 63/116,238, filed on Nov. 20, 2020.

(51) Int. Cl.
*H01R 4/56* (2006.01)
*E21B 33/03* (2006.01)
(Continued)

(52) U.S. Cl.
CPC ............... *H01R 4/56* (2013.01); *E21B 33/03* (2013.01); *H01R 4/26* (2013.01); *H01R 4/5025* (2013.01);
(Continued)

(58) Field of Classification Search
CPC .......... H01R 4/5091; H01R 4/26; H01R 4/56; H01R 11/26; H01R 43/00; H01R 4/5083;
(Continued)

(56) References Cited

U.S. PATENT DOCUMENTS 1,712,108 A * 5/1929 Goeller ................ H01R 4/5025 411/176
5,070,942 A 12/1991 McInnes
(Continued)

OTHER PUBLICATIONS

International Search Report and Written Opinion dated Mar. 11, 2022, PCT Application No. PCT/US2021/060019, 11 pages.

*Primary Examiner* — Renee S Luebke
*Assistant Examiner* — Paul D Baillargeon
(74) *Attorney, Agent, or Firm* — MH2 Technology Law Group, LLP

(57) ABSTRACT

An electrical connector assembly for a wellhead penetrator includes a first connector including an insertion body and defining a bore, the bore being configured to receive an electrical conductor. The insertion body includes a helical engaging member and defines a helical slot. The assembly includes a second connector defining a cavity therein, the cavity being configured to receive at least a portion of the insertion body therein, and the cavity being tapered such that advancing the insertion body into the cavity causes the helical engaging member to compress radially inwards into engagement with the electrical conductor.

18 Claims, 7 Drawing Sheets

(51) Int. Cl.
*H01R 4/26* (2006.01)
*H01R 4/50* (2006.01)
*H01R 11/26* (2006.01)
*H01R 43/00* (2006.01)

(52) U.S. Cl.
CPC ............. *H01R 11/26* (2013.01); *H01R 43/00* (2013.01); *H01R 4/50* (2013.01)

(58) Field of Classification Search
CPC .......... H01R 4/5075; H01R 4/12; H01R 4/22; H01R 4/24; H01R 4/2404; H01R 4/2408; H01R 4/28; H01R 4/30; H01R 4/304; H01R 4/305; H01R 4/38; H01R 4/50; H01R 4/5008; H01R 4/5016; H01R 4/5025; H01R 4/5033; H01R 4/5041; H01R 4/505; E21B 33/03; E21B 17/028
See application file for complete search history.

(56) References Cited

U.S. PATENT DOCUMENTS

| | | | | |
|---|---|---|---|---|
| 5,377,747 | A | 1/1995 | Didier | |
| 5,833,490 | A | 11/1998 | Bouldin | |
| 8,066,525 | B2 * | 11/2011 | Melni | H01R 11/12<br>439/271 |
| 2019/0106948 | A1 | 4/2019 | O'Grady et al. | |
| 2019/0218878 | A1 | 7/2019 | Sneed et al. | |

* cited by examiner

SPIRAL LOCK ELECTRICAL CONNECTION ASSEMBLY

CROSS-REFERENCE TO RELATED APPLICATIONS

This application is a U.S. National Stage application of PCT/US2021/060019, filed Nov. 19, 2021, which claims priority to U.S. Provisional Patent Application having Ser. No. 63/116,238, which was filed on Nov. 20, 2020, and are incorporated herein by reference in its entirety their entireties.

BACKGROUND

A wellhead may be positioned at the top of a production well, providing an interface between a pipe system above the wellhead and production tubing positioned in the well. More particularly, the wellhead may seal the well and prevent fluids produced from the well from exposure to the surrounding environment, while permitting the produced fluid to enter into the pipe system.

Wellheads may also include openings that permit communication with areas or components within the well. For example, a wellhead penetrator may be positioned through such an opening, sealing the opening while providing for conduction of electricity therethrough. Such electrical power may be provided, e.g., to an electric submersible pump (ESP) positioned in the well. Accordingly, the penetrator may connect to a heavy-gauge, electrically-conductive wire that extends into the well, down to the ESP, and may thus include specialized connectors that provide reliable electrical contact in the potentially harsh environment of the well. Further, the connectors are able to accept conductors having a relatively wide range of diameters, given the loose tolerancing of the conductors.

A packer penetrator is another type of electrically-conductive structure that is employed in a well. For example, such penetrators may be used to feed electrical power through a packer to a powered device (e.g., a pump) below. Packer penetrators may likewise call for specialized electrical connectors that provide reliable connection in a harsh environment, while accepting loosely-toleranced leads.

SUMMARY

Embodiments of the disclosure include an electrical connector assembly for a wellhead penetrator that includes a first connector including an insertion body and defining a bore, the bore being configured to receive an electrical conductor. The insertion body includes a helical engaging member and defines a helical slot. The assembly includes a second connector defining a cavity therein, the cavity being configured to receive at least a portion of the insertion body therein, and the cavity being tapered such that advancing the insertion body into the cavity causes the helical engaging member to compress radially inwards into engagement with the electrical conductor.

Embodiments of the disclosure also include a method for attaching an electrical connector assembly to an electrical conductor. The method includes receiving a first connector onto the electrical conductor. The first connector includes an insertion body in which the electrical conductor is received. The insertion body has a helical engaging member that extends around the electrical conductor. The method also includes receiving at least a portion of the insertion body into a cavity formed in a second connector, and rotating the second connector relative to the first connector. Rotating the second connector relative to the second connector drives the first connector farther into the second connector, and driving the first connector farther into the second connector causes the helical engaging member to press into the electrical conductor and to press against the second connector, so as to form an electrical and physical connection between the electrical conductor, the first connector, and the second connector.

Embodiments of the disclosure further include an electrical connector assembly for a wellhead penetrator. The electrical connector assembly includes an insertion body and defining a bore, the bore for receiving an electrical conductor. The insertion body includes a helical engaging member and defines a helical slot that extends radially through the insertion body. The insertion body also includes threads that are separate from the helical engaging member. The assembly further includes a connector body defining a cavity therein, the cavity for receiving at least a portion of the insertion body therein. The cavity is tapered such that advancing the insertion body into the cavity causes the helical engaging member to compress radially inwards into engagement with the electrical conductor. The cavity is at least partially threaded for engaging the threads of the insertion body, such that rotation of the connector body relative to the insertion body causes the insertion body to move axially with respect to the connector body. The assembly further includes an electrical contact coupled to the connector body. The insertion body conducts electricity from the electrical conductor to the electrical contact via the connector body, when the insertion body is coupled to the connector body and does not conduct electricity with the electrical conduct when the insertion body is not coupled to the connector body.

BRIEF DESCRIPTION OF THE DRAWINGS

The present disclosure may best be understood by referring to the following description and accompanying drawings that are used to illustrate some embodiments. In the drawings.

DETAILED DESCRIPTION

Figure 1:
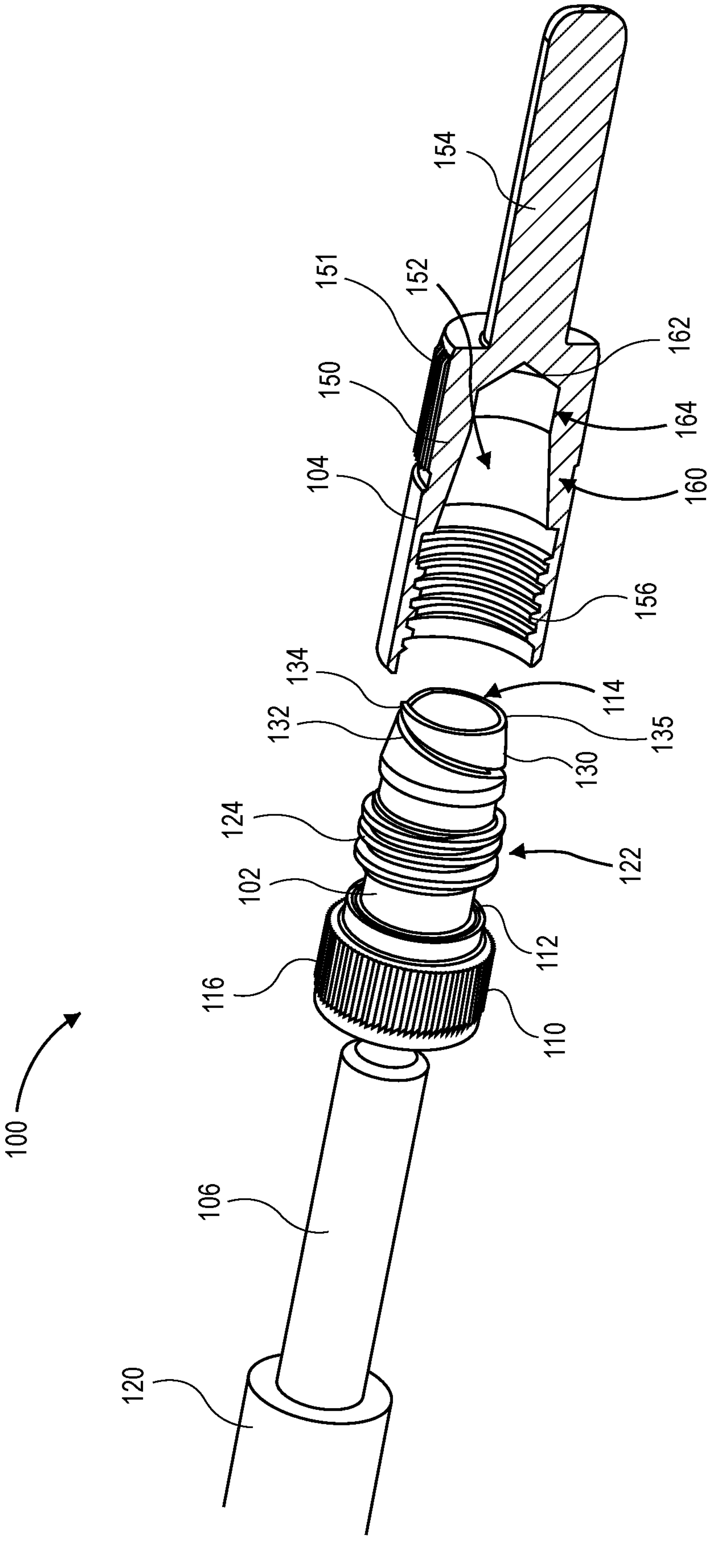
FIG. 1 illustrates an exploded, perspective view of an electrical connector assembly for connection to an electrical conductor, according to an embodiment.
Figure 2A:
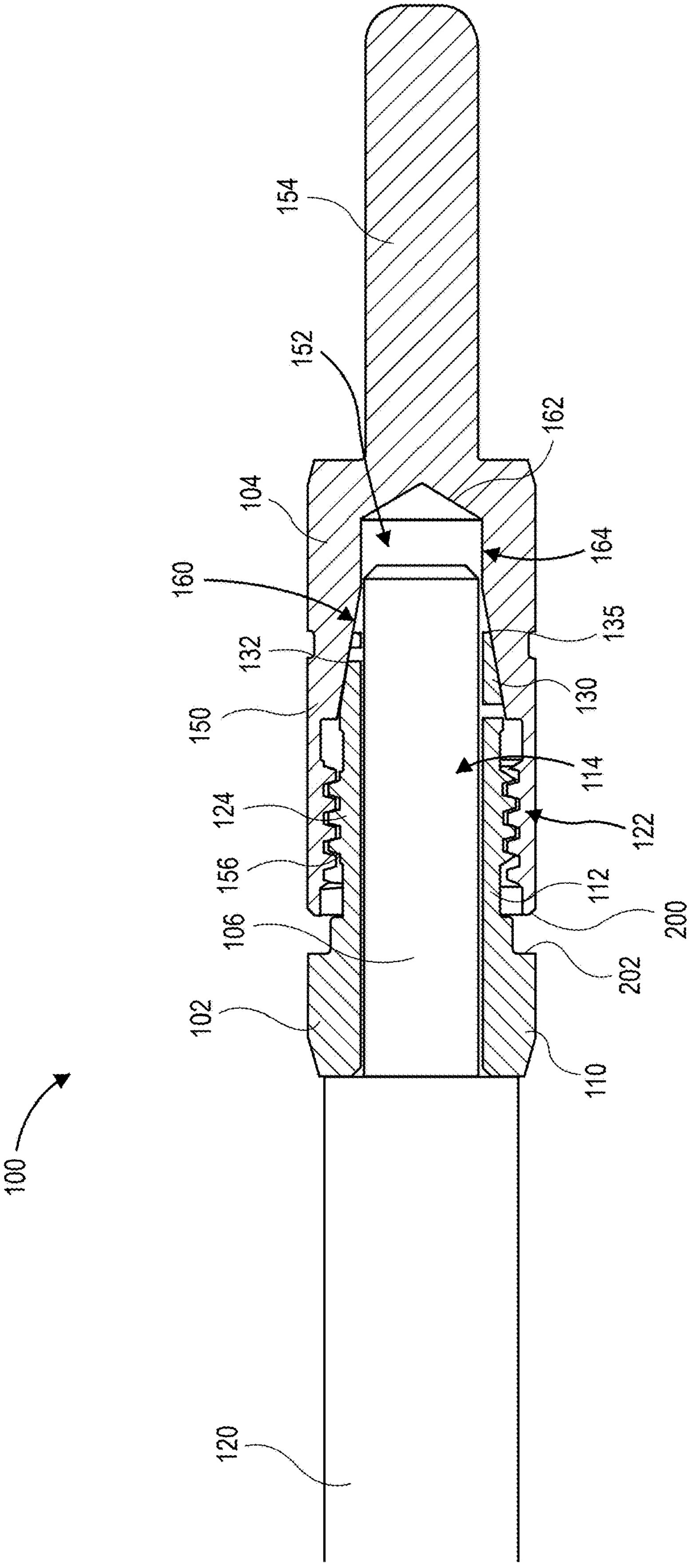
FIG. 2A illustrates a side, cross-sectional view of the electrical conductor assembly connected to the electrical conductor, according to an embodiment.
Figure 2B:
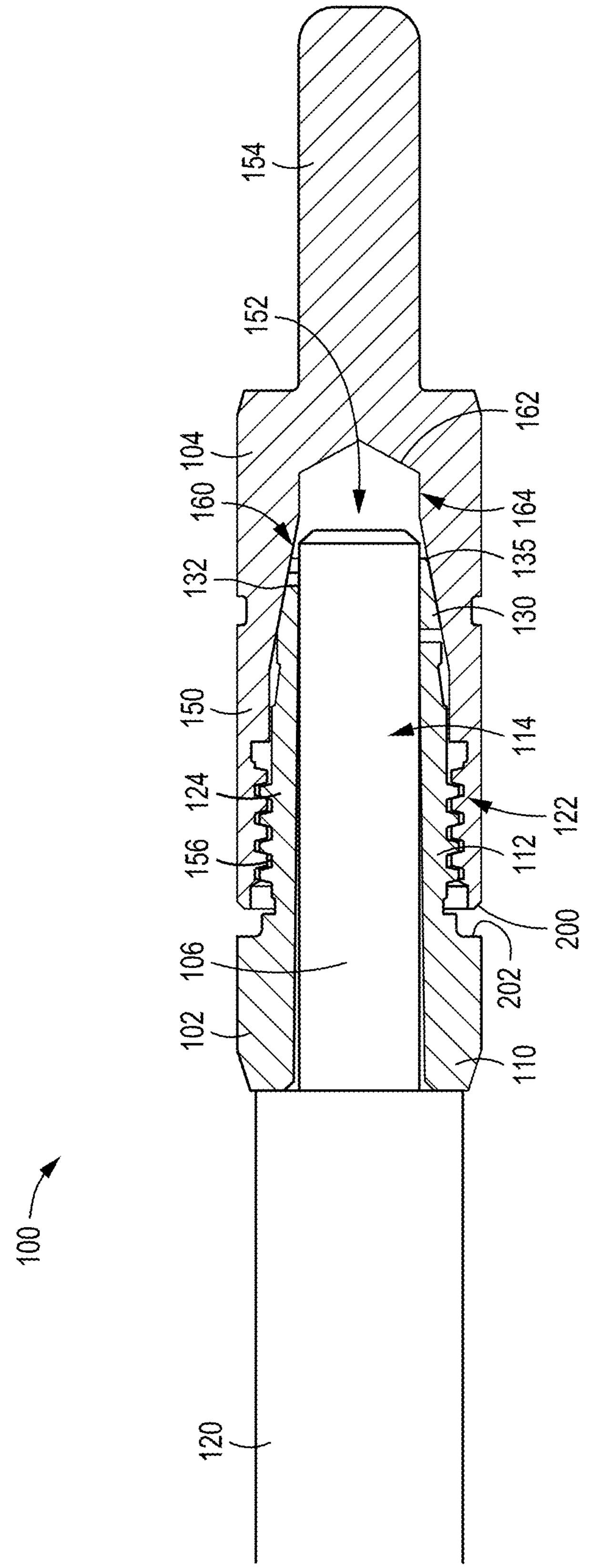
FIG. 2B illustrates a side, cross-sectional view of the electrical conductor assembly with a helical engaging member having radial compression with the electrical conductor, according to an embodiment.
Figure 2C:
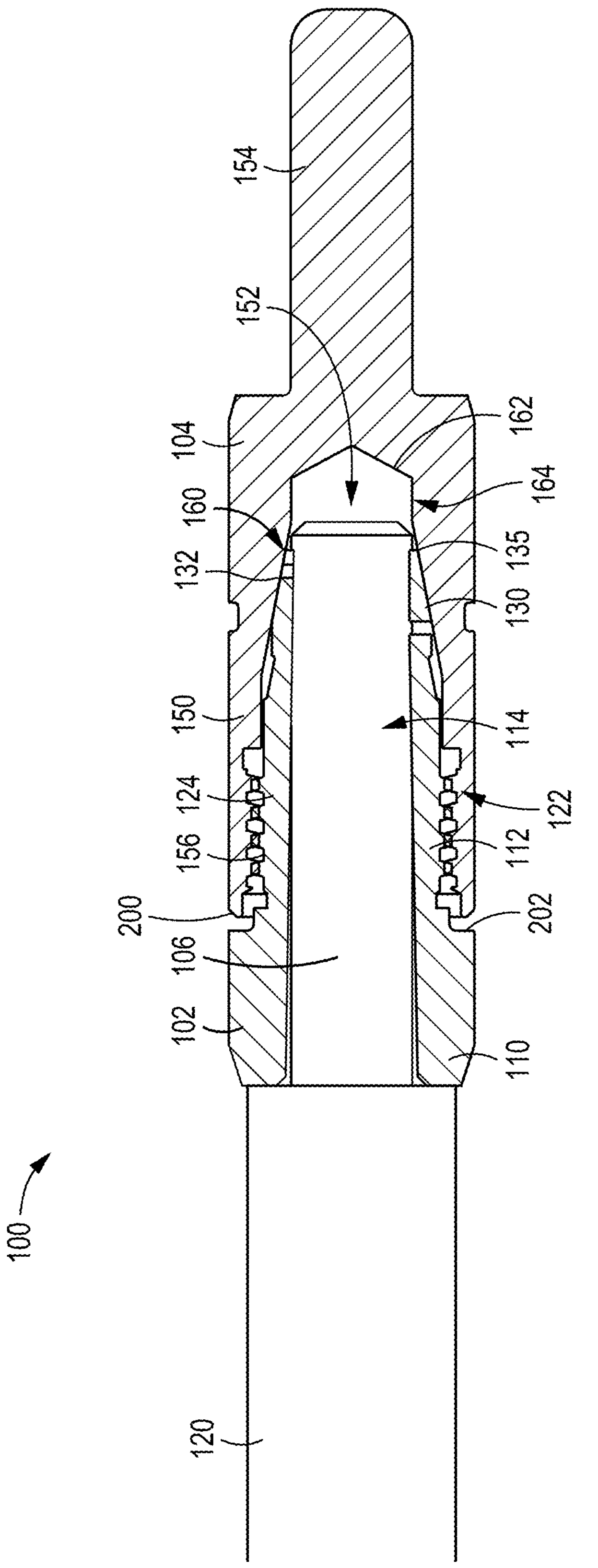
FIG. 2C illustrates a side, cross-sectional view of the electrical conductor assembly with the helical engaging member pressing into the electrical conductor, according to an embodiment.
Figure 2D:
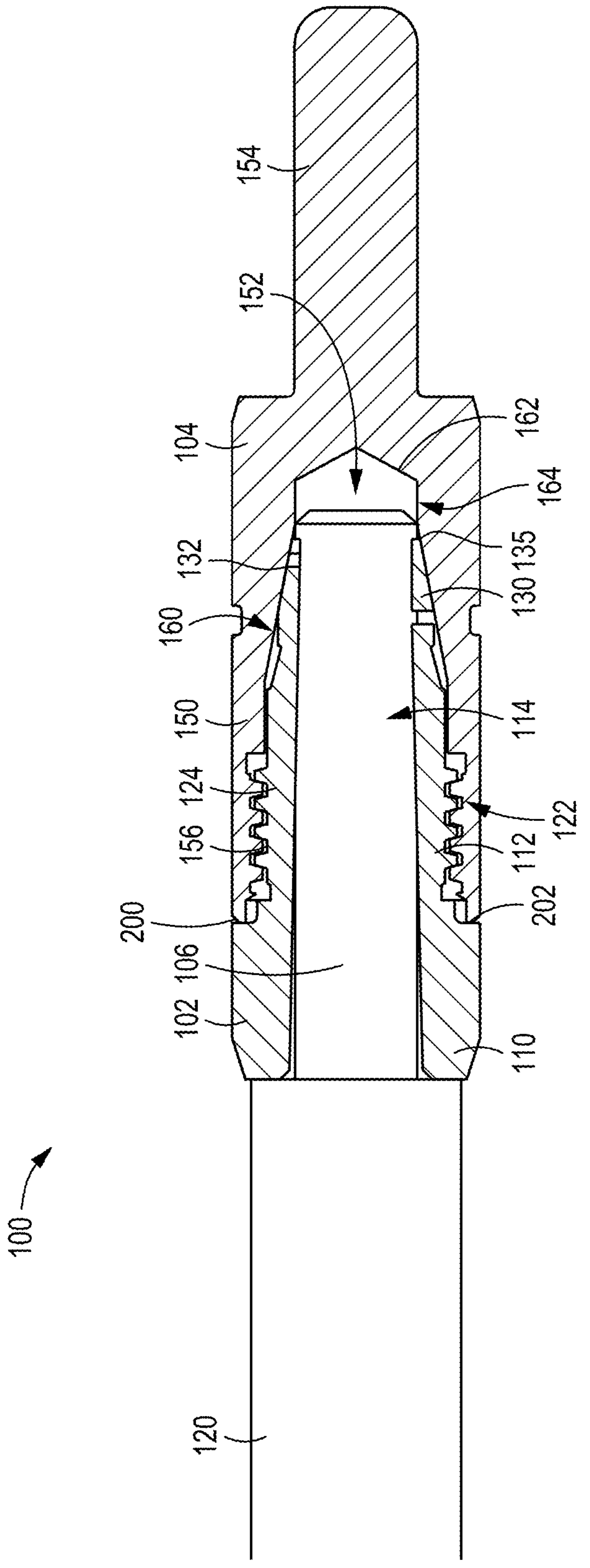
FIG. 2D illustrates a side, cross-sectional view of the electrical conductor assembly with the helical engaging member embedding (e.g., biting) into the electrical conductor, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms “including” and “comprising” are used in an open-ended fashion, and thus should be interpreted to mean “including, but not limited to.” All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, “or” statements are intended to be non-exclusive; for example, the statement “A or B” should be considered to mean “A, B, or both A and B.”

FIG. 1 illustrates a perspective, exploded view of an electrical connector assembly 100, according to an embodiment. The assembly 100 may be configured to provide electrical communication with or in a penetrator that extends through a wellhead or a packer, for example, although it could be used for other applications as well. The assembly 100 may generally include a first connector 102 and a second connector 104, which are configured to mate (couple) together to form an electrically-conductive path from an electrical conductor 106 (e.g., a solid copper wire lead) to another conductive structure (not shown).

The first connector 102 may include a base 110 and an insertion body 112 that extends from the base 110. The base 110 and the insertion body 112 may be formed from a material that is electrically conductive and harder than the electrical conductor 106. For example, the base 110 and insertion body 112 may be formed from brass (e.g., nickel and/or gold plated) or the like. The base 110 and the insertion body 112 may each be generally cylindrical, as shown, and may define a bore 114 at least partially therethrough. The bore 114 may be sized to be received onto the electrical conductor 106.

In at least one embodiment, the base 110 may be larger in diameter than the insertion body 112, and may include a gripping feature (e.g., knurls, ridges, etc.) 116 on its outer surface for engagement with a human finger. In other embodiments, the gripping feature 116 may include flats or other structures configured to be engaged by a tool. In either example, the gripping feature 116 may assist in transmitting axially-directed force to the first connector 102, so as to press the first connector 102 onto the electrical conductor 106, e.g., until the base 110 engages an insulation 120 of the electrical conductor 106. The gripping feature 116 may also facilitate transmitting torque, e.g., from a user’s fingers or a tool, to the first connector 102.

The insertion body 112 may include a connection portion 122 that extends from the base 110. Threads 124 may be formed on the connection portion 122, e.g., as a ridge that extends helically around the insertion body 112. As such, the threads 124 may be external to the insertion body 112. Teeth, compression members, or other devices could also be used in lieu of or in addition to the threads 124 discussed herein, and as such, the threads 124 may be considered as an example.

The insertion body 112 may further include a helical engaging member 130 extending from the connection portion 122. As shown, the threads 124 may be separate from the helical engaging member 130, and they may perform different functions, as described herein, for example. The connection portion 122 may be axially between the base 110 and the helical engaging member 130. The helical engaging member 130 may extend around a central axis of the first connector 102, generally in the form of a helix. In at least one embodiment, a helical slot 132 may be cut into the insertion body 112 so as to define the helical engaging member 130. By provision of the helical slot 132, the rigidity of the insertion body 112 that forms the helical engaging member 130 may be reduced as compared, e.g., to the connection portion 122. As such, the helical engaging member 130 may be pressed radially inward, as will be described in greater detail below. In some embodiments, the helical slot 132 may not extend all the way radially through the insertion body 112, but may include a groove or an area of reduced thickness that is configured to fracture or deform more easily than a remainder of the insertion body 112. In addition, the helical engaging member 130 may be “tapered”, i.e., reduce in diameter, in this case, as proceeding to a distal end 135 of the insertion body 112.

In at least one embodiment, the helical slot 132 may extend in a circumferential direction that is opposite to the circumferential direction of the threads 124, when viewed in the same axial direction. That is, the threads 124 may be, for example, right-hand directed as proceeding away from the distal end 135 and toward the base 110, while the helical slot 132 is left-hand directed. As such, when rotating the first connector 102 in a right-hand direction to advance the threads 124, a distal tip 134 of the helical engaging member 130 may trail the rotation rather than lead such rotation. Thus, as friction-induced torque forces are applied to the helical engaging member 130, such torque may serve to assist the radial compression of the helical engaging member 130, as will be described in greater detail below.

The second connector 104 may include a generally-cylindrical “connector” body 150 that defines a cavity 152 therein, and an electrical contact 154 that extends from the body 150. The body 150 and the electrical contact 154 may be formed from the same material as the base 110 and insertion body 112 of the first connector 102. The electrical contact 154 may be, for example, a pin configured to be received into a receptacle (e.g., a plug) in at least some embodiments. For example, the pin may be integral with the connector body 150, and may be of similar diameter to the electrical conductor 106, but may be relatively tightly toleranced as compared to the tolerancing of the electrical conductor 106. As such, the pin may provide a reliable electrical connection, e.g., as a plug for receipt into a receptacle.

When the first and second connectors 102, 104 are coupled together, the electrical conduct 154 may conduct electricity to the conductor 106 via the connectors 102, 104. When the connectors 102, 104 are not coupled together (e.g., separated apart), the conductor 106 may not communicate electrically with the contact 154.

On the outside of the body 150, a gripping feature 151 may be provided, e.g., as knurling, ridges, etc., which may facilitate application of torque to the second connector 104, as will be described in greater detail below. The cavity 152, defined within the body 150, may be configured to receive at least a portion of the first connector 102 therein, e.g., at least a portion of the insertion body 112. The body 150 may include threads 156 formed therein. For example, the threads 156 may be formed by a helical groove cut into the inner surface of the body 150. The threads 156 may be shaped and otherwise configured to receive and mesh with the threads 124 of the first connector 102, such that relative rotation between the first and second connectors 102, 104 (e.g., by rotation of either or both connectors 102, 104) may cause the first connector 102 to advance axially relative to the connector 104, e.g., into or out of the cavity 152, depending on the direction of rotation.

The body 150 may further define a tapered portion 160 in the cavity 152. The tapered portion 160 may reduce in diameter as proceeding toward an end 162 of the cavity 152. Additionally, the cavity 152 may include a lower portion 164, which may be generally constant in diameter, leading to the end 162. The end 162 may be conical, but in other embodiments may be flat, concave, or any other shape.

FIGS. 2A-2D illustrate cross-sectional views of the electrical connector assembly 100, according to an embodiment. As shown, the bore 114 of the first connector 102 receives the electrical conductor 106 therethrough. Once the first connector 102 is received onto the electrical conductor 106, the first connector 102 may be connected to the second connector 104. For example, the second connector 104 may be slid onto the first connector 102, such that the insertion body 112 is received into the cavity 152 until the threads 124, 156 engage. The second connector 104 may then be rotated relative to the first connector 102, while the first connector 102 is prevented from rotating relative to the electrical conductor 106, e.g., by friction/resistance between the bore 114 and the electrical conductor 106 and/or by a user gripping the base 110 using his/her fingers and/or with a tool.

Rotating the second connector 104 relative to the first connector 102 in one rotational direction may cause the threads 124 of the first connector 102 to mesh with the threads 156 of the second connector 104 and thereby advance the insertion body 112 farther into the cavity 152. Rotation in the opposite direction may cause the first connector 102 to back out of the second connector 104, e.g., to break the connection therebetween.

As the first connector 102 is advanced into the cavity 152, the helical engaging member 130 may engage the inside of the body 150 in the tapered portion 160 of the cavity 152. As noted above, the helical engaging member 130 may also be tapered, e.g., reverse tapered in comparison to the tapered portion 160. Accordingly, continuing to advance the first connector 102 into the cavity 152 may result in a wedging action, which causes the helical engaging member 130 to be pressed radially inward by engagement with the body 150. In turn, the helical engaging member 130 may bite into the electrical conductor 106 (e.g., at least partially embed therein, such that an physical interface between the helical engaging member 130 and the electrical conductor 106 is formed where the portion of the helical engaging member 130 embeds into the electrical conductor 106), as the helical engaging member 130 may be harder than the electrical conductor 106. Accordingly, reliable physical and electrical connection is made between the first and second connectors 102, 104 at least via the helical engaging member 130 pressing into the electrical conductor 106 and pressing against the wall of body 150 forming the cavity 152 in the tapered portion 160.

Moreover, the helical shape of the helical engaging member 130 may ensure that a generally uniform, predictable radial gripping force is applied by the engagement with the tapered portion 160 of the cavity 152. In some embodiments, the first connector 102 may be advanced into the cavity 152 until an axial surface 200 of the base 110 engages an axial end 202 of the body 150, but in other embodiments, the engagement between the tapered portion 160 of the cavity 152, the helical engaging member 130, and the electrical conductor 106 may permit (and/or cause) such advancement to stop prior to the surface 200 engaging the end 202. Further, the distal end 135 of the first connector 102 may be spaced apart from the end 162 of the cavity 152, such that at least part of the lower portion 164 may provide space for the electrical conductor 106 to protrude from the distal end 135.

Accordingly, in general, it will be appreciated that embodiments of the present disclosure may provide an electrical connector assembly that may form a reliable and strong connection with a conductor, e.g., to provide a plug end for the conductor. The electrical connector assembly may avoid use of set screws that are conventionally used to press into the conductor to hold the connector in place. Further, the electrical connector assembly may be self-locking, as rotating the connectors relative to one another causes the helical engaging member to bite into the electrical conductor. As such, additional fasteners to tighten the connection may not be required, in at least some embodiments. At least some embodiments of the electrical connector assembly may be hand-tightened, and thus may not require any additional tools to connect the electrical connector assembly to the conductor.

Figure 3:
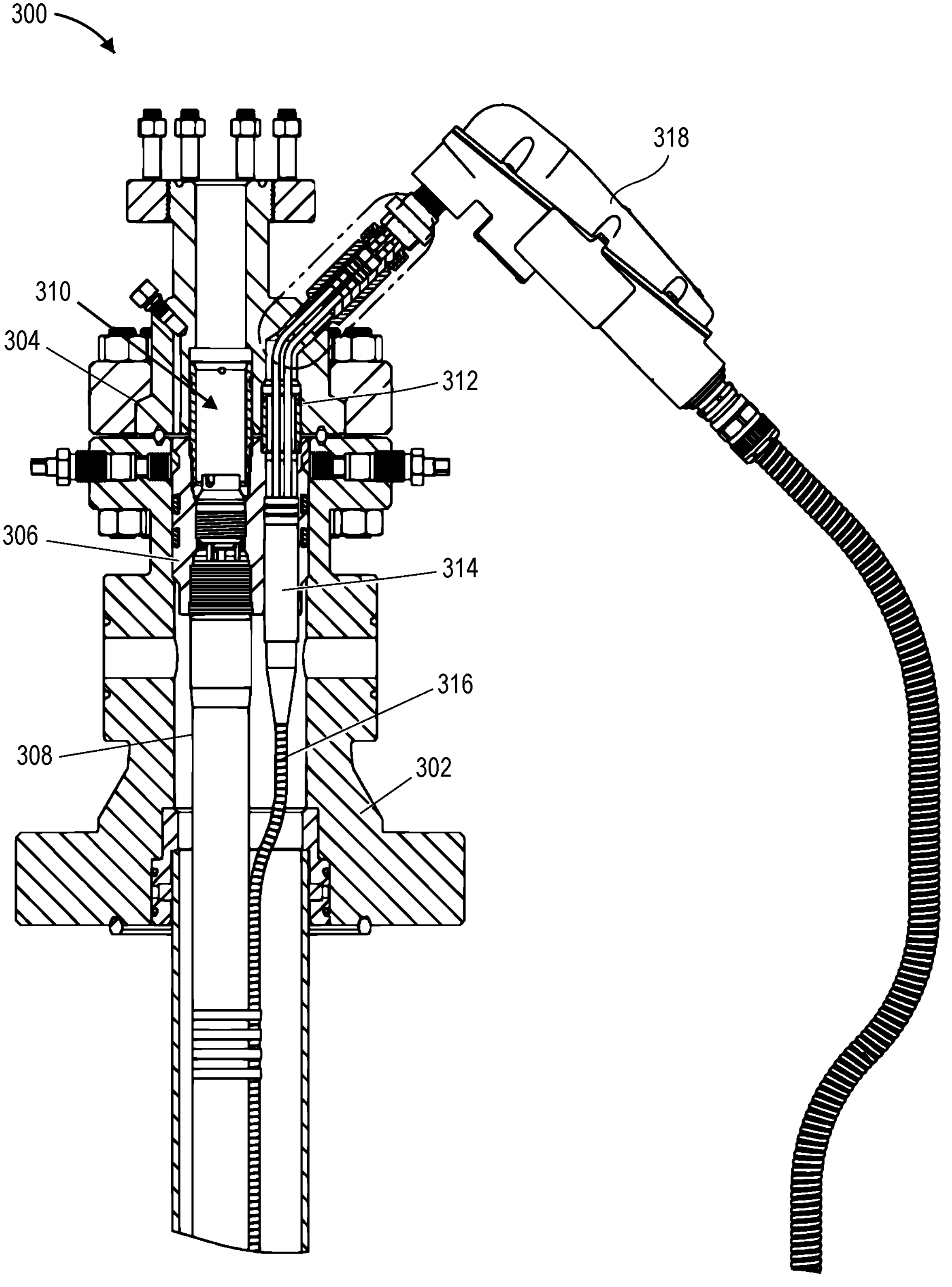
FIG. 3 illustrates a side, cross-sectional view of a wellhead assembly that includes one or more electrical connector assemblies, according to an embodiment.

FIG. 3 illustrates a side, cross-sectional view of a wellhead assembly 300, which may implement an embodiment of the electrical connector assembly 100 discussed above, according to an embodiment. The wellhead assembly 300 may generally include a wellhead 302, a wellhead adapter 304 that is connected to the top of the wellhead 302, and a tubing hanger 306 positioned in and supported by the wellhead 302. Production tubing 308 may extend downwards from the tubing hanger 306 and be supported in tension therefrom. The production tubing 308 may communicate through the wellhead 302 via a central conduit 310.

The adapter 304 and the hanger 306 may define a port 312 therethrough. A penetrator 314 may extend through the port 312 and connect to an electrical cable 316 extending therefrom. The electrical cable 316 may communicate with and provide power to a submersible pump in the well below. The penetrator 314 may also connect to a power connection 318 which may extend to or otherwise be connected with a power source (e.g., a generator, a power grid, etc.).

One or more of the electrical connector assemblies 100 discussed above may be provided for connecting the penetrator 314 to the cable 316. In particular, the cable 316 may be an armored cable including three conduits (e.g., three of the conductors 106 discussed above) therein. One electrical connector assembly 100 may be employed for each, so as to provide a plug end for the cable 316, permitting the individual conductors 106 thereof to be electrically connected to the penetrator 314 and to the power connection 318.

Figure 4:
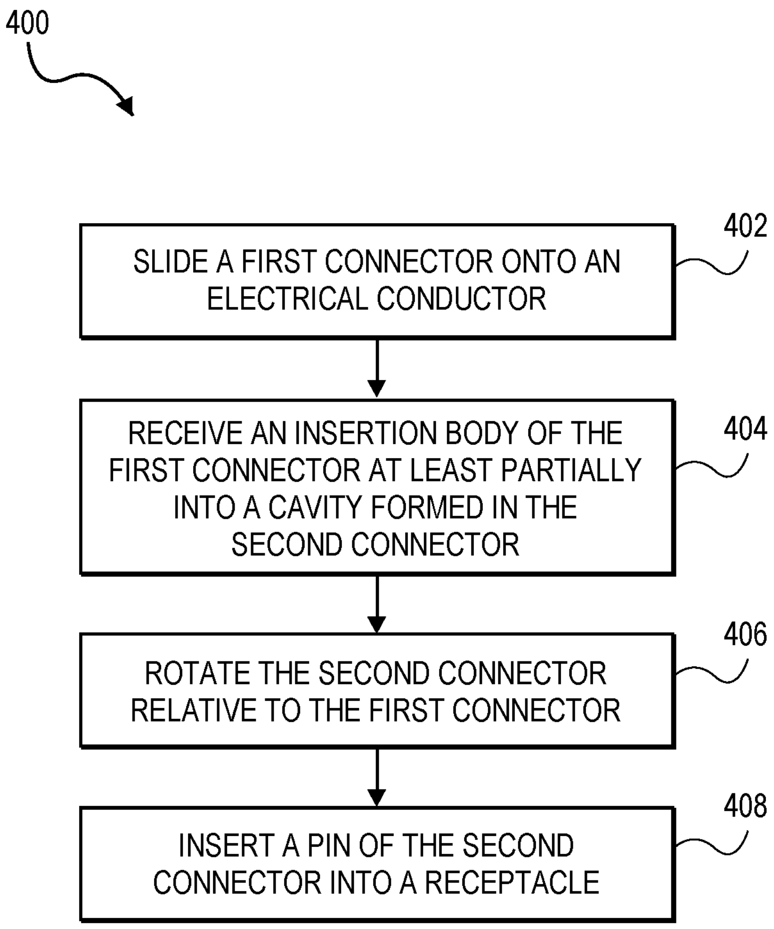
FIG. 4 illustrates a flowchart of a method for attaching an electrical connector assembly to an electrical conductor, according to an embodiment.

FIG. 4 illustrates a flowchart of a method 400 for attaching an electrical connector assembly to an electrical conductor, according to an embodiment. The method 400 may be performed using an embodiment of the electrical connector assembly 100 discussed above, but may instead be performed using other structures. Further, various aspects of the method 400 may be performed in an order that is different from the one discussed herein and/or aspects of the method 400 may be combined, separated, performed in parallel, etc., without departing from the scope of the present disclosure.

The method 400 may include sliding a first connector 102 onto the electrical conductor 106, as at 402. This may be performed by a human user, either by hand or using a tool. A gripping feature 116 may be provided on the first connector 102 to facilitate application of force that causes such sliding. The first connector 102 may include a connection member, such as threads 124, and a helical engaging member 130, as discussed above.

The method 400 may then include receiving an insertion body 112 of the first connector 102 into a cavity 152 of a second connector 104, as at 404. The cavity 152 may include threads 156 or other connection members configured to interface with the connection member of the first connector. The cavity 152 may also include a tapered portion 160.

The method 400 may include rotating the second connector 104 relative to the first connector 102 so as to advance the first connector 102 into the second connector 104, as at 406. This may also occur either by hand or by using a tool. For example, the second connector 104 may also include a griping feature 151. Rotating the second connector 104 relative to the first connector 102 may be accomplished by rotating either or both connectors 102, 104 relative to the electrical conductor 106.

Rotating the second connector 104 relative to the first connector 102 may cause the threads 124, 156 to drive the first connector 104 farther into the cavity 152. As first connector 102 is driven into the cavity 152, the inner wall of the second connector 104, specifically the portion thereof that defines the tapered portion 160, may press radially against the helical engaging member 130, progressively increasing the radial-inward force applied thereto as the first connector 102 progresses into the cavity 152. At some point, the helical engaging member 130 may press against and then bite into (embed at least partially in) the electrical conductor 106, with the radial-inward travel being generally greater as proceeding toward a distal end 135 of the first connector 102 (corresponding to an increased amount of inward taper along the tapered portion 160 of the cavity 152). Further, torque forces incident on the helical engaging member 130 from engagement with the wall of the cavity 152 may further increase the radially-inward gripping force, e.g., by compressing the helical slot 132, as the helical engaging member 130 may extend in reverse orientation to the threads 124, as discussed above.

As such, the helical engaging member 130 may be entrained between the electrical conductor 106 and the second connector 104, thereby producing a friction force that resists movement between the first and second connectors 102, 104. As a result, the first and second connectors 102, 104 may produce a reliable electrical and physical connection, e.g., without the use of fasteners (e.g., set screws, other types of screws, bolts, etc.) to hold the first connector 102 on the electrical conductor 106, or to hold the first connector 102 in position within the second connector 104.

An electrical contact (e.g., pin) 154 of the second connector 104, in some embodiments, may then be inserted (plugged) into a receptacle, thereby forming a connection between the electrical conductor 106 and another component via the electrical connector assembly 100, as at 408.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrical connector assembly for a wellhead penetrator, the electrical connector assembly comprising:

a first connector comprising an insertion body and defining a bore, the bore being configured to receive an electrical conductor, wherein the insertion body comprises a helical engaging member and defines a helical slot; and a second connector defining a cavity therein, the cavity being configured to receive at least a portion of the insertion body therein, and the cavity being tapered such that advancing the insertion body into the cavity causes the helical engaging member to compress radially inwards into engagement with the electrical conductor.

2. The electrical connector assembly of claim 1, wherein the first connector further comprises a base, wherein the insertion body comprises a connection portion extending from the base, and wherein the helical engaging member extends from the connection portion.

3. The electrical connector assembly of claim 2, wherein the first connector comprises threads positioned on the connection portion, and wherein the second connector comprises threads in the cavity that are configured to mesh with the threads of the first connector, so as to couple the first and second connectors together by rotating at least one of the first or second connector relative to the other.

4. The electrical connector assembly of claim 3, wherein the helical slot extends in a first circumferential direction as proceeding in an axial direction, and wherein the threads of the first connector extend in a second circumferential direction that is opposite to the first circumferential direction as proceeding in the axial direction.

5. The electrical connector assembly of claim 3, wherein a tip of the helical engaging member points away from a direction of rotational insertion into the cavity.

6. The electrical connector assembly of claim 3, wherein the cavity comprises a first section having the threads, and a tapered second section extending from the first section toward an end of the cavity.

7. The electrical connector assembly of claim 2, wherein the helical engaging member is tapered inward as proceeding from the connection portion to a distal end of the first connector.

8. The electrical connector assembly of claim 1, wherein the helical engaging member is configured to bite into the electrical conductor in response to being forced into the cavity such that at least a portion of the helical engaging member embeds into the electrical conductor, so as to resist displacement of the first connector relative to the electrical conductor.

9. The electrical connector assembly of claim 1, wherein the second connector comprises a generally cylindrical base in which the cavity is defined, and a pin extending from the base, for connection to another electrical conductor.

10. The electrical connector assembly of claim 1, wherein the first connector comprises a first gripping section configured to be gripped by human fingers or a tool, so as to permit the first connector to be forced onto the electrical conductor and to resist rotation relative thereto, and wherein the second connector comprises a second gripping section configured to be gripped by human fingers or a tool, so as to permit the second connector to be rotated relative to the first connector.

11. A method for attaching an electrical connector assembly to an electrical conductor, comprising:

receiving a first connector onto the electrical conductor, wherein the first connector comprises an insertion body in which the electrical conductor is received, the insertion body having a helical engaging member that extends around the electrical conductor;

receiving at least a portion of the insertion body into a cavity formed in a second connector; and rotating the second connector relative to the first connector, which drives the first connector farther into the second connector, and wherein driving the first connector farther into the second connector causes the helical engaging member to press into the electrical conductor and to press against the second connector, so as to form an electrical and physical connection between the electrical conductor, the first connector, and the second connector.

12. The method of claim 11, wherein the insertion body is externally threaded and the cavity is internally threaded, such that threads of the insertion body are advanced into engagement with threads of the cavity by rotating the second connector relative to the first connector.

13. The method of claim 12, wherein the helical engaging member defines a helical slot, and wherein the helical slot extends in a reverse circumferential direction to the threads of the insertion body.

14. The method of claim 11, wherein the cavity comprises a tapered portion, and wherein driving the first connector into the second connector causes the tapered portion to press inwards on the helical engaging member.

15. The method of claim 11, further comprising inserting a pin of the second connector into a receptacle, so as to form an electrical connection between the receptacle and the electrical conductor via the first and second connectors.

16. The method of claim 11, wherein rotating comprises directly engaging the first connector, the second connector, or both with fingers of a human user.

17. An electrical connector assembly for a wellhead penetrator, the electrical connector assembly comprising:

an insertion body defining a bore, the bore for receiving an electrical conductor, wherein the insertion body comprises a helical engaging member and defines a helical slot that extends radially through the insertion body, and wherein the insertion body comprises threads that are separate from the helical engaging member;

a connector body defining a cavity therein, the cavity for receiving at least a portion of the insertion body therein, wherein the cavity is tapered such that advancing the insertion body into the cavity causes the helical engaging member to compress radially inwards into engagement with the electrical conductor, and wherein the cavity is at least partially threaded for engaging the threads of the insertion body, such that rotation of the connector body relative to the insertion body causes the insertion body to move axially with respect to the connector body; and an electrical contact coupled to the connector body, wherein the insertion body conducts electricity from the electrical conductor to the electrical contact via the connector body when the insertion body is coupled to the connector body and does not conduct electricity with the electrical conductor when the insertion body is not coupled to the connector body.

18. The electrical connector assembly of claim 17, wherein the helical engaging member is configured to bite into the electrical conductor in response to being forced into the cavity such that at least a portion of the helical engaging member embeds into the electrical conductor, so as to resist displacement of the insertion body relative to the electrical conductor.

* * * * *